Patented Oct. 4, 1932

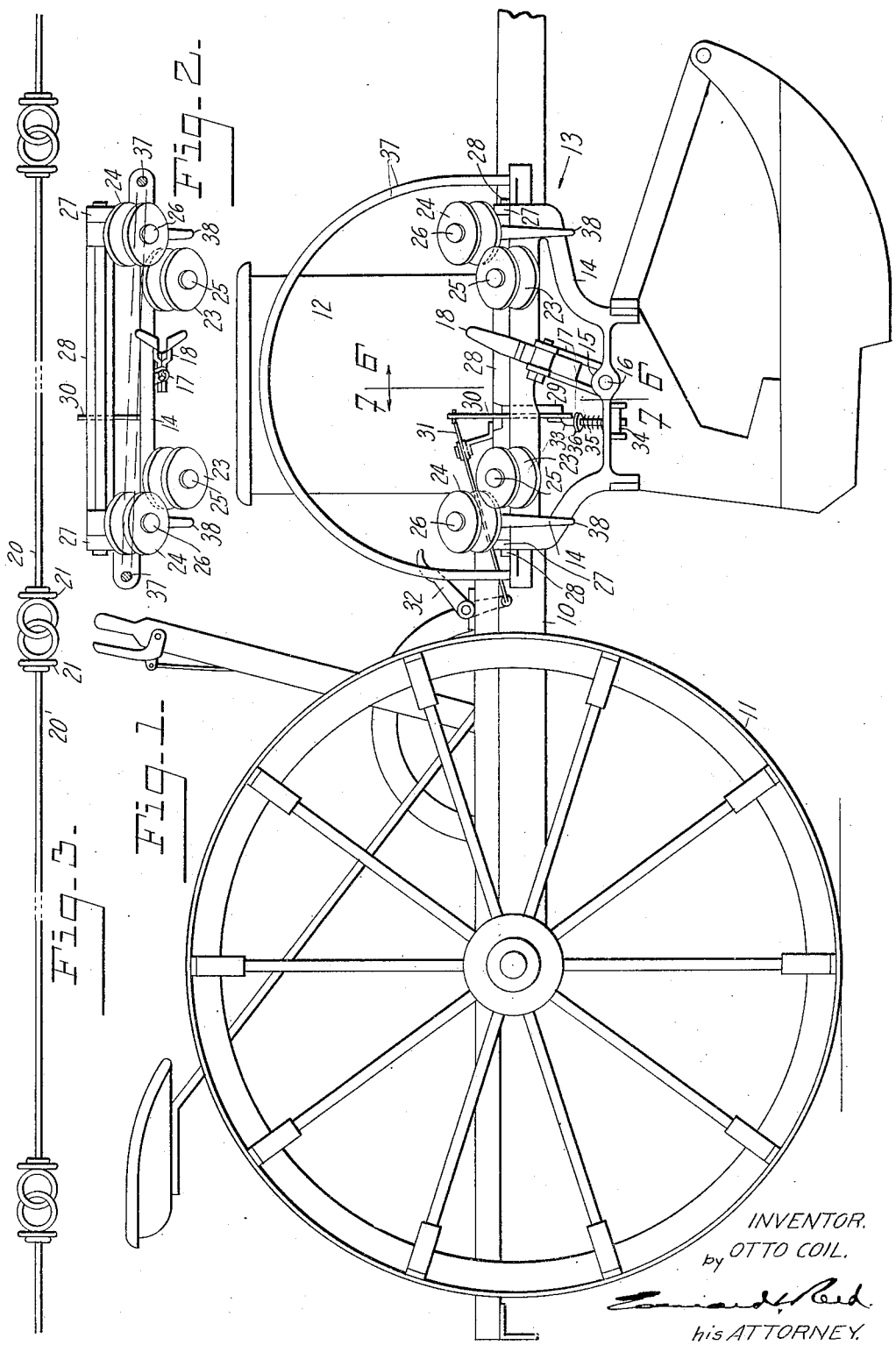

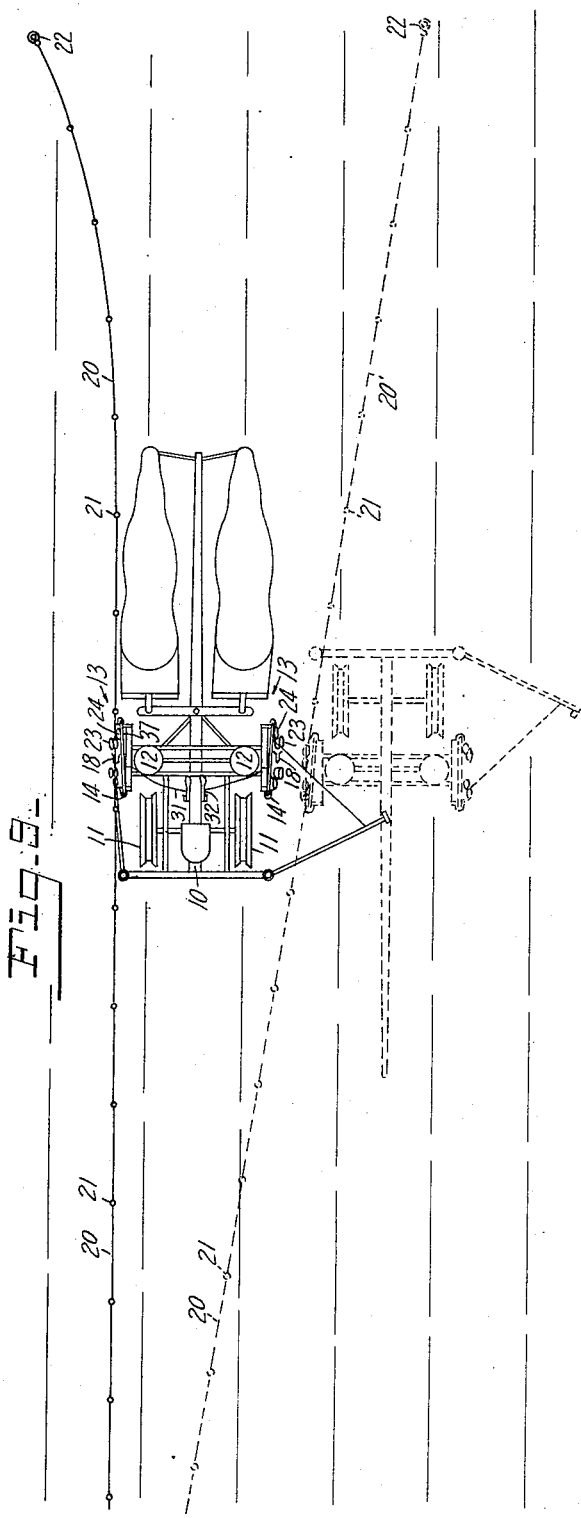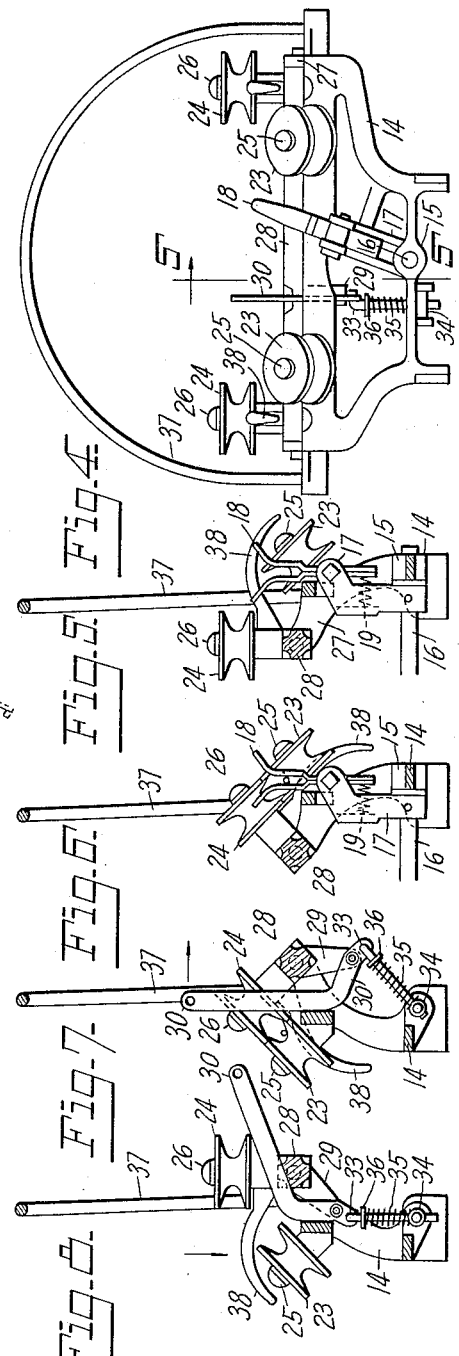
INVENTOR.
OTTO COIL.
his ATTORNEY.

1,881,261

UNITED STATES PATENT OFFICE

OTTO COIL, OF NEAR WASHINGTON COURTHOUSE, OHIO

CHECK HEAD

Application filed April 4, 1931. Serial No. 527,696.

This invention relates to a check head for a corn planter, or the like, of the type commonly known as a check row planter. With planters of this type the corn is dropped in equally spaced hills in the row by means of planting mechanism, the operation of which is controlled by a check wire extending lengthwise of the row and anchored near the ends of the row. The planter is provided on both sides thereof with a "check head" comprising a device for actuating the planting mechanism and guides to maintain the check wire in proper operative relation to the actuating device as the machine moves along the check wire, the latter having projections or stops to engage the actuating device and cause the grains of corn to be dropped at the proper times. The planter usually plants two rows at a time and the actuating device of each check head is operatively connected with both planting mechanisms but the check wire engages but one check head at a time. When the planter reaches the end of the row, which is usually some little distance from the anchor for the check wire, the wire is released from the guiding means and the machine turned to face in the opposite direction in proper position to plant the succeeding row or rows. This turning of the machine brings the check head on the opposite side thereof adjacent to the check wire but the machine is then spaced some distance from the check wire. The operator then leaves the machine, pulls up the anchor, approaches the machine to place the check wire in proper relation to the guiding means and actuating device of the check head and then returns to the anchor to draw the wire taut and set the anchor in a new position, in line with the planter. After the anchor has been set he returns to the machine, adjusts the guiding means to retain the wire in its proper position with relation to the actuating device and then proceeds with the planting operation. This operation of changing the check wire and engaging the same with the check head requires much unnecessary walking and loss of time on the part of the operator and, further, it frequently happens that when the check wire is placed in engagement with the check head one of the stops or projections thereon will be in operative relation to the actuating device and when the wire is drawn taut the actuating device will be operated to drop grains of corn where they are not wanted.

One object of the present invention is to provide a check head for a planter of this type which will be of such a character that the check wire may be quickly and easily engaged therewith by the operator from a position adjacent to the anchor.

A further object of the invention is to provide a check head of such a character that the guide rollers will be automatically moved to their closed positions by the setting of the anchor.

A further object of the invention is to provide such a check head with means for preventing the check wire from operating the actuating device when the wire is drawn taut and the anchor set.

A further object of the invention is to provide such a check head which will be simple in its construction, easily operated and which may be produced at a relatively low cost.

Other objects of the invention will appear as the mechanism is described in detail.

In the accompanying drawings Fig. 1 is a side elevation of a corn planter showing the invention applied thereto; Fig. 2 is a top plan view of the check head with the upright guide in section; Fig. 3 is a detail view of a portion of a check wire; Fig. 4 is a side elevation of the check head with the movable guide members in their inoperative positions; Fig. 5 is a section taken on the line 5—5 of Fig. 4, looking in the direction of the arrow; Fig. 6 is a similar view with the movable guide members in their operative positions; Fig. 7 is a section taken on the line 5—5 of Fig. 4, looking in the direction opposite that indicated by the arrow, with the movable guide member in its operative position; Fig. 8 is a view similar to Fig. 7 with the movable guide member in its inoperative position; and Fig. 9 is a diagrammatic view showing the position of the planter with relation to the check wire.

In these drawings I have illustrated one embodiment of the invention and have shown the same applied to a corn planter of a well known type. It will be understood, however, that the mechanism may take various forms and may be applied to planters of various kinds without departing from the spirit of the invention.

The corn planter here illustrated comprises a main frame 10 supported by ground wheels 11. Mounted on this main frame in advance of the ground wheels are two corn receptacles 12 from which the corn is delivered to suitable planting mechanism, not here shown. The check heads are mounted on the opposite sides of the main frame 10 adjacent to the respective planting mechanisms and are indicated as a whole by the reference numeral 13. The check heads are identical in construction and each comprises a frame 14 which may be of any suitable construction adapted to support the mechanism and to be mounted upon a planter of the desired type. Each check head frame has a bearing 15 in which is mounted the adjacent end of an operating shaft 16 which controls the operation of the planting mechanism. Secured to this shaft and, in the present instance, extending upwardly therefrom, is an actuating device which is here shown in the form of a trip arm comprising a lower portion 17 rigidly secured to the shaft 16, and an upper portion 18 adapted to be engaged by a check wire and which is preferably in the form of a fork adapted to receive the check wire and having its two members spaced apart such a distance that they will be engaged by the projections or stops on the check wire, as the machine advances, and the trip arm operated. The trip arm moves to such a position that the stop on the check wire will ride over the upper end of the fork and thus release the arm and permit the same to be returned to its initial position by a spring acting on the shaft 16 but not here shown. Preferably the upper part or fork of the trip arm is pivotally mounted on the lower part 17 of the trip arm on an axis extending lengthwise of the planter so that the fork may swing outwardly, away from the planter, so as to more readily release the check wire when the latter is to be disconnected from the check head. The lower end of the fork extends below its axis and is acted upon by a spring 19 which yieldably retains the fork in its upright position. The check wire may be of any suitable character and, as shown in Figs. 3 and 9, comprises a series of links 20 pivotally connected one to the other at their adjacent ends and provided adjacent to their points of connection with disks 21 which form stops to engage the actuating device. The check wire is provided at each end with an anchor 22 which is usually in the form of a pin adapted to be thrust into the ground.

The check head is provided with suitable guide members to maintain the check wire in proper relation to the actuating device during the operation of the machine and a part of these guide members are movable into an inoperative position to release the check wire when this is desired. Preferably there are two pairs of guide members, one pair being arranged in advance of the actuating device and the other pair being arranged in the rear of the actuating device. In the present construction these guide members are in the nature of rollers, one roller 23 of each pair being mounted on a fixed axis and the other roller 24 of each pair being mounted on a movable axis so that it can be moved into and out of operative relation to the first mentioned roller. Each roller has a relatively deep peripheral groove to receive the check wire, these grooves being of such size that when the guide rollers are in their operative positions the grooves will provide a space sufficiently large for the passage of stops on the check wire. The lower or stationary guide rollers are so arranged that the upper or wire receiving portions of the grooves therein will face upwardly so that the check wire may move by gravity into operative engagement therewith. As here shown, these rollers are journaled on studs 25 mounted on the frame 14 of the check head and extending upwardly and outwardly therefrom so that the lower rollers 23 are supported in inclined positions. The upper or movable guide rollers 24 are shown as mounted on studs 26 supported on inwardly extending arms 27 forming a part of the frame 14. In order that the two check rollers may move in unison I have mounted the studs 26 to a shaft 28 which is supported by the arms 27 and is here shown as a casting having trunnions mounted in bearings on the arms. The studs 26 are so arranged that the guide rollers 24 may be moved downwardly into a position closely adjacent to the lower guide rollers 23 or may be moved to an upright position on the inner side of the frame and thus spaced from the lower guide rollers. For the purpose of actuating the movable guide rollers I have secured to the shaft 28 a crank arm 29 to the lower end of which is pivotally connected an angular actuating lever 30, the upper end of which is connected with a suitable actuating device on the frame of the planter, such as a foot lever 32 connected with the lever 30 by a cable 31. The guide rollers are yieldably retained in the positions to which they have been moved and to this end the actuating lever 30 extends a short distance beyond its point of connection with the crank arm 29 and has pivotally connected therewith a rod 33 the other end of which is slidably mounted in a pivoted stud 34 mounted on the frame 14. A compression spring 35 is coiled about the rod 33 and confined between the stud 34 and a collar 36 on the rod and is normally under compression. The rod 33 is so arranged that when the lever 30 is actuated the point of connection between the lever and the crank arm will be moved across a line extending through the axis of the shaft 28 and the stud 34, the spring being placed under greater compression as the rod passes its central position. Thus the spring serves to complete the movement of the movable guide rollers and to retain the same in the positions to which they have been moved.

An upright guide 37 is mounted in a fixed position on the frame 14 and extends lengthwise of that frame and for a considerable distance above the guide rollers and actuating device. Preferably this upright guide is arranged in a plane which extends between the guide rollers of each pair when the movable guide rollers are in their inoperative positions. Connected with the movable guide rollers and, in the present instance, carried by the studs 26 are wire supporting members or arms 38 which move with the upper guide rollers and are so arranged that when these guide rollers are in their inoperative positions, or spaced from the lower rollers, the supporting arms will extend across the upright guide 37 and be positioned above the lower guide rollers and the actuating device, but when the upper guide rollers are moved into their operative positions with relation to the guide rollers these supporting arms will move downwardly to a position below the wire engaging portions of the lower rollers. Preferably the wire supporting arms are curved upwardly and have their highest points directly above the fork of the actuating device so that these arms will slope downwardly toward the upright guide 37 and will also slope downwardly and outwardly. Consequently if the check wire is brought into engagement with the upright guide 37, when the upper rollers are in their inoperative positions, the wire will move downwardly along the guide into engagement with the supporting arms and will be supported in a position above and out of operative relation to the actuating device. When the wire is drawn taut and the anchor pushed into the ground the wire will exert a downward pressure on the supporting arms and cause these arms to move the movable rollers to their closed positions with relation to the fixed rollers. This movement of the supporting arms will carry the same below the fixed rollers and permit the wire to move downwardly along the upright guide into the fork of the actuating device, the upper end of which is flared to receive the same, and into operative relation to the lower guide rollers.

In operation, when the planter reaches the end of the row, the operator actuates the foot lever 32 to move the guide rollers to their inoperative positions and then turns the planter to the position shown in dotted lines in Fig. 9. At the time that the guide rollers are moved to their inoperative positions and the wire released therefrom the wire is anchored at a point beyond the machine and out of line with the check head and is therefore subjected to a lateral pull away from the machine and when released from the guide rollers will swing the fork of the actuating device outwardly and escape therefrom. When the planter has been properly positioned in a reverse direction the operator leaves the machine, pulls up the anchor 22 and, from his position adjacent to the anchor, swings the check wire into engagement with the outer side of the upright guide 37 and the wire being slack will be guided downwardly by the guide 37 into engagement with the supporting arms 38. The operator then draws the check wire taut and sets his anchor in a new location in the rear of the planter and by so doing depresses the supporting arms to move the rollers to their closed positions with the wire between them. The supporting arms 38 support the wire above the actuating device until the slack has been taken out of the wire and there is no possibility of the actuating device being actuated by the stop on the wire as the latter is drawn taut. After the wire has been again anchored the operator returns to the machine and proceeds with the planting operation.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a check head for a planter, a device to actuate the planting mechanism, a pair of cooperating guide members to maintain a check wire in operative relation to said actuating device, one of said guide members having an upwardly facing wire engaging surface and the other of said guide members being movable into and out of a position to confine said check wire between said guide members, an upright guide arranged alongside of said actuating device and said guide members and extending above the same in all positions thereof to engage said check wire, when the latter is slack, and guide the same into its operative position with relation to said actuating device and said guide members, and means for actuating said movable guide member.

2. In a check head for a planter, a device to actuate the planting mechanism, a pair of grooved rollers arranged one above the other to receive a check wire between them and maintain the same in operative relation to said actuating device, means for moving the upper roller toward and from the lower roller, and means for guiding the check wire into its operative position with relation to said lower roller and said actuating device when said upper roller is spaced from said lower roller.

3. In a check head for a planter, a device to actuate the planting mechanism, a pair of grooved rollers arranged one above the other to receive a check wire between them and maintain the same in operative relation to said actuating device, means for moving the upper roller toward and from the lower roller, and a guide mounted alongside of and extending above said rollers to guide the check wire into a position between said rollers and into operative relation to said actuating device.

4. In a check head for a planter, a device to actuate the planting mechanism, a pair of grooved rollers arranged one above the other to receive a check wire between them and maintain the same in operative relation to said actuating device, the lower roller being mounted in an inclined position with the upper portion of its groove substantially in line with its actuating device, and the upper roller being movable toward and from the upper side of said lower roller, a guide extending above said lower roller and arranged in a plane which extends between said rollers when the upper roller has been moved from said lower roller, and means for actuating said upper roller.

5. In a check head for a planter, a device to actuate the planting mechanism, a pair of guide members adapted to receive a check wire between them and maintain the same in operative relation to said actuating device, one of said members having its wire engaging surface facing upwardly and the other of said members being movable toward and from said wire engaging surface of the first mentioned member, a wire supporting member mounted for movement to a position above or below the wire engaging surface of said first mentioned member, means for actuating said movable guide member and said wire supporting member, and means to guide said check wire into engagement with said supporting member when the latter is in its uppermost position and said movable guide member is spaced from said first mentioned guide member.

6. In a check head for a planter, a device to actuate the planting mechanism, a pair of grooved rollers adapted to receive a check wire between them and to maintain the same in operative relation to said actuating device, one of said rollers having the wire receiving portion of its groove facing upwardly and the other of said rollers being movable toward and from the upper side of the first mentioned roller, a wire supporting member connected with said movable roller for movement into a position below the wire receiving portion of the groove in said first mentioned roller when said movable roller is moved toward said first mentioned roller, and to a position above said first mentioned roller when said movable roller is moved from said first mentioned roller, means for actuating said movable roller and said supporting member, and a guide extending above said rollers and arranged to guide the check wire into engagement with said supporting member when the latter is in the last mentioned position.

7. In a check head for a planter, a device to actuate the planting mechanism, upper and lower rollers to receive a check wire between them and maintain the same in operative relation to said actuating device, the upper roller being movable toward and from the lower roller, a guide extending above said rollers and arranged in a plane extending between said rollers when the latter are spaced one from the other, and an arm connected with said movable roller for movement therewith and so arranged that when said upper roller is spaced from said lower roller said arm will intersect the plane of said guide at a point above said lower roller.

8. A check head for a planter comprising a frame, two pairs of grooved rollers mounted on said frame and adapted to receive a check wire between them, a guide mounted on said frame and extending a substantial distance above said rollers, the rollers of each pair being mounted on opposite sides of said guide and one of said rollers being movable into and out of operative relation to the other roller, means for actuating the movable rollers in unison, arms connected with the respective movable rollers for movement therewith into positions above the other rollers when said movable rollers are moved from said other rollers, and an actuating device for the planting mechanism arranged between said pairs of rollers.

9. In a check head for a planter comprising a frame, two pairs of grooved rollers mounted on said frame and adapted to receive a check wire between them, a guide mounted on said frame and extending a substantial distance above said rollers, one roller of each pair being mounted in an inclined position on the outer side of said guide and the other roller of each pair being pivotally mounted on the inner side of said guide for movement toward and from the first mentioned roller, an actuating device for the planting mechanism arranged between the two pairs of rollers and having a fork portion to receive the check wire, arms connected with the respective movable rollers and arranged to support the check wire above said outer rollers and said actuating device when the inner rollers are spaced from said outer rollers and to cause said check wire to move into operative relation to said outer rollers and said actuating device when said inner rollers are moved toward said outer rollers.

10. In a check head for a planter, upper and lower guide members, the upper guide member being movable toward and from the lower guide member, a wire support movable into and out of a position above said lower guide member, means for actuating said upper guide member and said wire support, and an upright guide to guide a check wire into engagement with said wire support when said upper guide member is spaced from said lower guide member and to guide said check wire into engagement with the lower guide member when said upper guide member is moved toward said lower guide member.

11. In a check head for a planter, upper and lower guide members, the upper guide member being movable toward and from the lower guide member, an upright guide arranged adjacent to the inner side of the lower guide member and extending a substantial distance above the same, supporting arms connected with said upper guide members for movement therewith to positions above said lower guide members when said guide members are spaced one from the other, said supporting arm having its intermediate portion curved upwardly so that the upper edge thereof will slope toward said upright guide and also toward the outer side of said lower guide members, and means for actuating said movable guide members.

12. In a check head for a planter, a device to actuate the planting mechanism, guide members to maintain a check wire in operative relation with said actuating device, one of said guide members being movable toward and from the other guide member, means to guide said check wire into operative relation with said actuating device when said guide members are spaced apart, and means controlled by said check wire as it is moved toward said actuating device to cause said movable guide member to move toward the other guide member.

13. In a check head for a planter, a device to actuate the planting mechanism, guide members to maintain a check wire in operative relation with said actuating device, one of said guide members being movable toward and from the other guide member, means to guide said check wire into operative relation with said actuating device when said guide members are spaced apart, and a device arranged in the path of said check wire as the latter is guided toward said actuating device and adapted to be actuated thereby to cause said movable guide member to be moved toward the other guide member.

14. In a check head for a planter, a device to actuate the planting mechanism, guide members to maintain a check wire in operative relation to said actuating device, one of said guide members being movable into and out of an operative position with relation to the other guide member, an upright guide arranged alongside of and extending above said actuating device to be engaged by said check wire and guide the latter downwardly into operative relation to said actuating device, and a device operatively connected with said movable guide member and so arranged that it will be moved to a position above said actuating device and in the path of said check wire when said movable guide member is moved to its inoperative position and will be actuated by said check wire to cause said movable guide member to be moved to its operative position.

15. In a check head for a planter, a device to actuate the planting mechanism, guide members to maintain a check wire in operative relation to said actuating device, one of said guide members being pivotally mounted for movement into and out of an operative position with relation to the other guide member, an upright guide arranged alongside of and extending above said actuating device and said guide members to be engaged by said check wire and guide the latter downwardly into operative relation to said actuating device, and an arm connected with said pivoted guide member and so arranged that it will be moved to a position above said actuating device and in the path of the downward movement of said check wire when said movable guide member is moved to its inoperative position and will be actuated by said check wire when the latter is moved toward said actuating device to move said movable guide member to its operative position.

16. In a check head for a planter, a device to actuate the planting mechanism, guide members to maintain a check wire in operative relation with said actuating device, one of said guide members being movable toward and from the other guide member, means to guide said check wire into operative relation with said actuating device when said guide members are spaced apart, and a device operatively connected with said movable guide member and arranged to support said check wire in inoperative relation to the actuating device when the check wire is slack, said supporting device being yieldable under the influence of a downward pull on said check wire to permit said check wire to move into operative relation to said actuating device and to move said movable guide member toward the other guide member.

17. In a check head for a planter, a device to actuate the planting mechanism, guide members to maintain a check wire in operative relation with said actuating device, one of said guide members being movable toward and from the other guide member to permit the insertion and removal of said check wire, and a device connected with said movable guide member and arranged to hold said check wire in inoperative relation to said actuating device when said movable guide member is spaced from said other guide member and to be actuated by pressure exerted thereon by said check wire to release the latter for movement into operative relation with said actuating device.

18. In a check head for a planter, a device to actuate the planting mechanism, guide members to maintain a check wire in operative relation with said actuating device, one of said guide members being movable toward and from the other guide member, means arranged to be engaged by said check wire while the later is slack and to guide the same toward said actuating device when said guide members are spaced apart, and means arranged in the path of said check wire along said guiding means to hold said slack check wire in inoperative relation to said actuating device until said check wire has been drawn taut and to be actuated by pressure exerted thereon by said check wire to release the same for movement into operative relation to said actuating device.

19. In a check head for a planter, a device to actuate the planting mechanism, guide members to maintain a check wire in operative relation with said actuating device, one of said guide members being movable toward and from the other guide member, means arranged above said actuating device to be engaged by said check wire while the latter is slack and guide the same into operative relation to said actuating device when said guide members are spaced apart, and means to interrupt the movement of said check wire along said guiding means and support the same above and out of engagement with said actuating device until said check wire has been drawn taut and downward pressure exerted thereon and to then release the same for movement into operative relation to said actuating device.

In testimony whereof, I affix my signature hereto.

OTTO COIL.